(12) United States Patent
Stefan

(10) Patent No.: US 6,832,448 B2
(45) Date of Patent: Dec. 21, 2004

(54) GREENHOUSE

(76) Inventor: Robert Stefan, Wiflinger St. 31, D-94501 Aldersbach, Bavaria (DE)

(*) Notice: Subject to any disclaimer, the term of this patent is extended or adjusted under 35 U.S.C. 154(b) by 0 days.

(21) Appl. No.: 10/189,182

(22) Filed: Jul. 5, 2002

(65) Prior Publication Data

US 2004/0003536 A1 Jan. 8, 2004

(51) Int. Cl.⁷ .............................................. A01G 13/00
(52) U.S. Cl. ......................... 47/17; 160/84.06; 47/22.1
(58) Field of Search ......................... 47/17; 160/84.06, 160/84.01, 29; 211/88.02, 1.57, 46; 242/366.3, 398

(56) References Cited

U.S. PATENT DOCUMENTS

| | | | | |
|---|---|---|---|---|
| 3,100,950 A | * | 8/1963 | Heuer | 135/87 |
| 3,140,563 A | * | 7/1964 | Allen | 47/22.1 |
| 3,481,073 A | * | 12/1969 | Yoshida et al. | 47/17 |
| 5,265,373 A | * | 11/1993 | Vollebregt | 47/17 |
| 5,645,119 A | * | 7/1997 | Caruso | 160/370.23 |
| 5,794,679 A | * | 8/1998 | Williams et al. | 160/46 |
| 5,809,701 A | * | 9/1998 | Vollebregt | 52/13 |
| 5,813,168 A | * | 9/1998 | Clendening | 47/17 |
| 6,024,153 A | * | 2/2000 | Goldman | 160/61 |
| 6,182,737 B1 | * | 2/2001 | Kuwabara | 160/84.06 |

\* cited by examiner

Primary Examiner—Charles T. Jordan
Assistant Examiner—Susan C. Alimenti
(74) Attorney, Agent, or Firm—Dennison, Schultz, Dougherty & MacDonald

(57) ABSTRACT

A greenhouse on a support structure on posts with a hanging foil roof that can be opened, wherein the foil covering that forms the roof remains completely below the support structure formed by lattice girders in every position by being suspended form the rails on the underside of, and longitudinally to, the lattice girders is movable between the open and the closed position.

4 Claims, 3 Drawing Sheets

GREENHOUSE

BACKGROUND OF THE INVENTION

1. Field of the Invention

The present invention concerns a greenhouse having a suspended foil or film roof that may be opened when desired. Characteristically, a greenhouse is an artificially heated glass house that is used to start and grow plants such as flowers, decorative plants and vegetables independent of climatic conditions. Such greenhouses are typically equipped with ventilation means and with artificial lighting and sprinkler equipment.

2. Description of Related Art

It has been found to be more cost-effective to cover a greenhouse with a plastic film rather than glass. The flexibility of the plastic film allows the roof to be folded to an open position to expose the plants to natural solar radiation when weather conditions are suitable. The structures that are know in the prior art for opening and closing roofs are laborious in use, expensive to procure and time-consuming in use.

A typical prior art greenhouse with a hanging roof that can be opened, made from inflatable tubular film which is suspended from parallel tightened wires is described in the German Patent 22 23 158. In this construction, when the inflatable tubes are filled with air, they contact each other at the parallel tangential lines and due to their lower position, form a penetration area for rain water. Furthermore, filling them with air limits the penetration of light and ultraviolet rays on the plants in the greenhouse and the air filling will cause the formation of condensation.

Another suspended plastic film roof construction is shown in the German Patent 32 04 026. This roof construction is a hanging form and can be folded in a zigzag manner from a tight wire construction. With this construction, the plastic film covering or roof has multiple layers with air cushions between them and another plastic foil suspended below is permeable to air for humidity that can be controlled in the "closed" position. When moving these multi-layered plastic films and during strong rain or snow, the cover is mechanically unstable.

A relatively simple suspension of a single-layer plastic foil between two posts used as a covering for a greenhouse that features a weighted hanging ridge is shown in French Disclosure No. 2 488 102. No opening mechanism is disclosed. The position of the plastic foil in the direction of radiation can only be changed at the intermediate points.

French Publication No. 2 137 124 describes a greenhouse having a hanging folded roof that can be opened, however it consists of several frames pin-jointed at the bottom, which is the closed state, are deposited onto sloping tight wires. Each individual pin-joint consists of two spaced joints with a gutter interposed between them. The support wires run above across several rows of posts. The sides of the frames facing the joints, which stand vertically when opened, are reciprocally attached with side-to-side linkages that can be moved back and forth. The linkages are directed through necessarily upright positioned cable rolls to guide the folding movement of the frames between an upright standing and positioned at about 45 degrees on the tight wire for control. The construction effort with this greenhouse is very high due to the complexity of the support portion which is complex and is neither located underneath or above the roof, but rather within the movement level of the roof. Shadowing of the plants is also high, both in the open as well as the closed position.

SUMMARY OF THE INVENTION AND OBJECTS

In contrast to the known prior art, the present invention comprises aplastic film greenhouse having a rof that can be easily opened, close or adjusted to several intermediate positions as required. According to the invention, the plastic foil roof stays in any selected position beneath a light but stable support structure from which it is suspended. Even in the completely closed position, the foil or film hangs downwardly. A taught triangular cross-section is formed directed downwardly and the roof is attached to the support structure with two suspension lines. The downward pointing "ridge", that is the lowest hanging center line between two suspension lines, is provided with a slope or gradient along the longitudinal axis of the greenhouse in order to let rain water or condensation drain longitudinally. The ridge is weighted to keep the plastic film taut. Preferably, the is accomplished with the use of an elongated hollow pipe that is supported on the longitudinal center axis and is connected to the plastic fil or foil with a snap-in fastener or button. Alternatively, a heavy rod or the like may be used as well. It is important to have balanced weight along this center axis which, on one hand, makes for sufficient tightness of the foil and, on the other hand, does not compromise the light weight construction of the roof assembly.

The suspension lines are moveable perpendicularly to the greenhouse axis along the support structure towards each other and away from each other into any final side position without the use of pin-joints or other supports. In this way the plastic foil roof either opens or closes completely or partially. The roof portions hang vertically downwardly into the greenhouse letting in full daylight or sunlight when desired. When the two suspension line meet or are adjacent to each other in the center of the support structure, the plastic foil surface are nearly parallel to each other and are close together resulting in an opening of that portion of the roof.

If desired this hanging fold of plastic with its weight when the roof portion is open, may be rolled manually or otherwise upwards to effect an even more open roof.

It is an object of this invention to provide a greenhouse structure that includes a plastic foil or film roof adapted to hang vertically down in adjacent folds in a taut position both in the open and closed positions and which is safe for use in windy, rainy or snowy conditions.

Additional details of the construction and advantage of the invention are provided in the following detailed description of a preferred embodiment of the invention which is shown schematically in the drawings wherein like reference characters in the several views depict the same elements.

DETAILED DESCRIPTION OF THE INVENTION

Figure 1A:
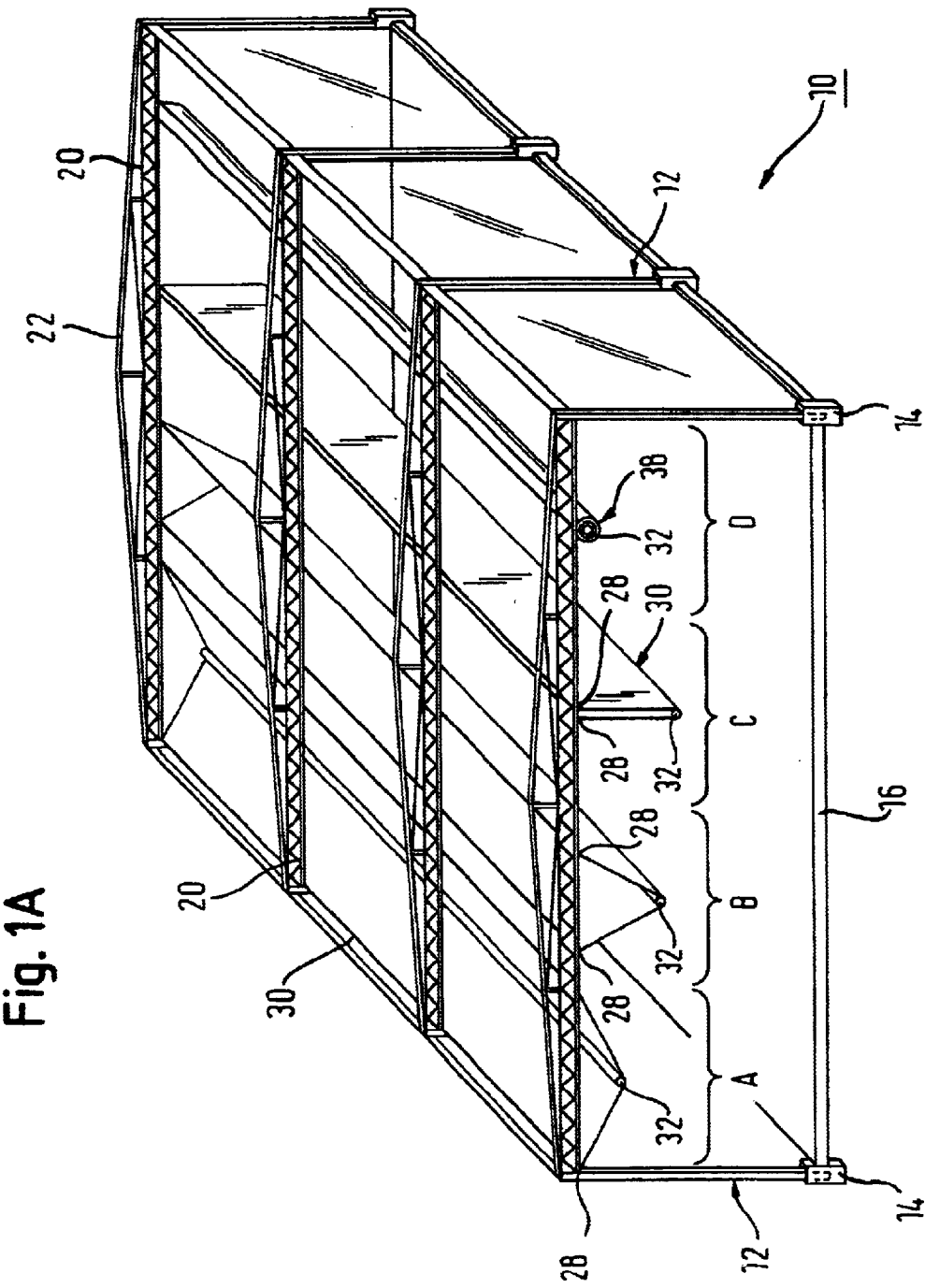
FIG. 1A is a schematic top perspective view of a greenhouse showing my invention.

The greenhouse shown generally at 10 consists of a number of sections A,B,C, and D which are adjacent to each other. Each of the individual sections can be regarded for purposes of description as a separate plastic foil or film greenhouse with its own side walls. Typically, vertical support posts 12, each secured to foundations 14 are erected on the horizontal base 16. Each of the posts 12 carries at its top a lightweight lattice girder member 20. An upper truss bracing 22 acts as a support structure and spans the greenhouse from one side to the other as shown in the figures. Suspension lines 28 run perpendicular to the lattice girders 20 and aligned along the axis of greenhouse 10. The lines are moveable along the girders 20 as will become more apparent herein.

A length of plastic foil 30 is suspended between adjacent pairs of lines 28 and serves as a hanging roof cover. For example, the plastic roof foil 30 in section A is shown as closed in FIG. 1A and the suspension lines are at their maximum distance from each other.

A hollow pipe or tube 32 is positioned within each fold of plastic foil 30 and lies in the fold perpendicular to the girders 20 and parallel to suspension lines 28. In the closed position of the roof section, it will be noted that the foil hangs downwardly due to the weight of the pipe or tube 32. As noted the pipe 32 maintains the length plastic foil taut in order to avoid fluttering.

In order to avoid an upward suction of the closed roof during a high wind or storm, a pull rope (not shown) may be used as a safeguard and will be anchored to the bottom of the pipe or elsewhere.

Figure 2:
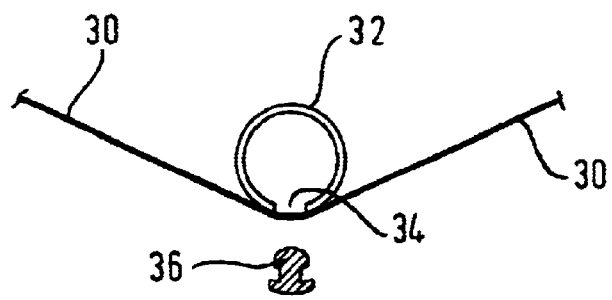
FIG. 2 is an exploded cross-sectional view similar to FIG. 3 and showing how the the plastic film roof and pipe are connected.
Figure 3:
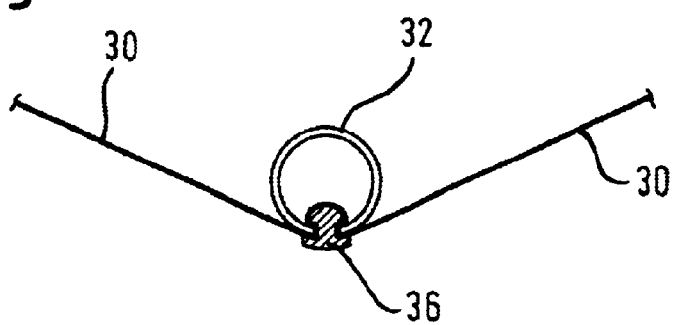
FIG. 3 is a cross-sectional view of a single plastic film fold showing the manner of securing the central pipe to the film.
Figure 3A:
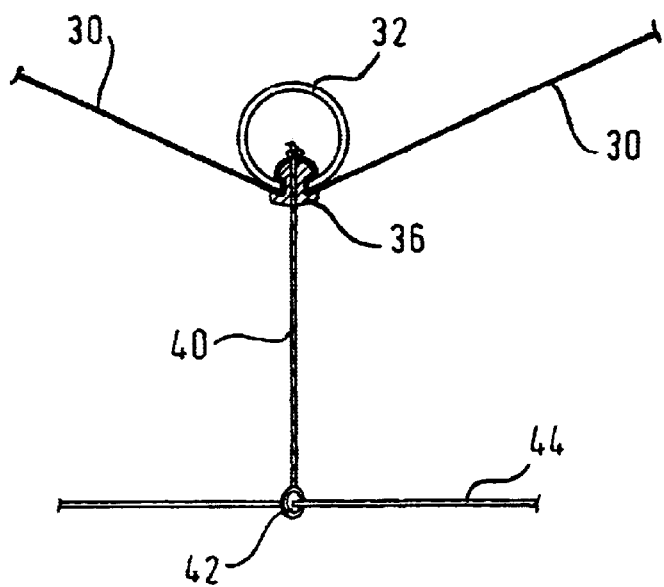

The plastic film 30 is shown as connected to the pipe 32. In this regard, the pipe may ne provided with a longitudinally running slot or notch 34, as shown in FIGS. 2 and 3. A clamp profile or button 36 may be snapped or fitted against the plastic foil and secured into the slot 34.

As an alternative to the hollow pipe 32, a solid bar or rod may also be attached to the foil in order keep it taut In either case, this inner ridge line includes a slope in the longitudinal direction from one side to the other in order to catch and disperse rainwater and condensation. Additionally, a gutter can be used mounted on the back wall of the greenhouse to collect the water from the ridges.

Section B of FIG. 1A shows the roof section partly open. The suspension lines 28 are moved towards each other. In section C, the fully open position is depicted wherein the plastic film or foil 30 is shown with the lines 28 nearly touching and the lengths of the foil laying back-to-back.

Section D of FIG. 1A discloses the back-to-back foil portions being rolled up around the pipe 32 forming a roll 38 positioned against the underside of the lattice girders 20. The pipes 32 could be axially extended for application of a winding mechanism such as a crank if desired.

Figure 1B:
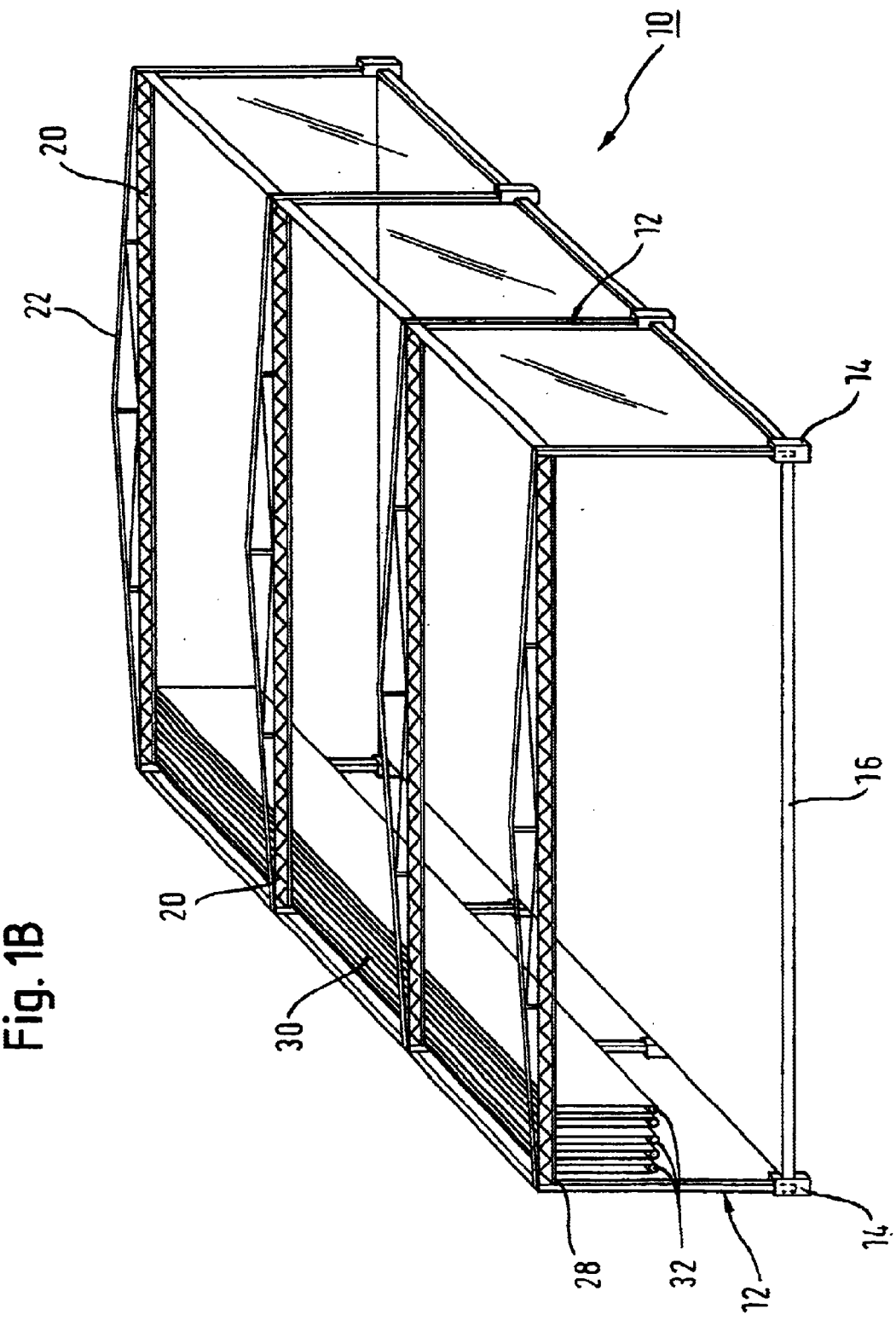
FIG. 1B is schematic top perspective view similar to FIG. 1A, but showing the roof in its entirely open position.

All of the sections, whether open as in section C or open and rolled as in section D, may be pushed together as in FIG. 1B.

It will be understood that the greenhouse 10 may be formed with many sections A, B, . . . and the roof positions may be all the same or different. Further it is contemplated that the construction may be mechanized and automated if desired. The present description shows only the principle of the variability of a hanging roof. It is important that the entire design be light in weight with light weight metal lattice grids 20 and truss bracing 22.

What is claimed is:

1. In a greenhouse construction including a base, a plurality of spaced upright supporting posts, a plurality of generally parallel horizontal grids connecting a pair of posts, the improvement comprising;

a hanging foil roof that may be opened or closed and including spaced parallel suspension lines moveable along said grids, a plastic film roof member attached to adjacent pairs of suspension lines so that the roof member is suspended from and hangs downwardly from and between said pairs of suspension lines, an elongated weighted member in the form of a hollow pipe slotted along its length and running perpendicular to said grids and resting within the fold of said film roof member which extends from adjacent suspension lines, said roof being open when said adjacent suspension lines are brought together, and a button attaching means for forcing said film roof member into the lot of the elongated weighted member for securing the pipe to the roof member, and said roof being closed when said adjacent suspension lines are drawn apart.

2. The greenhouse as defined in claim 1, wherein said weighted member slopes slightly downwardly from one end to the other in order to provide a water drainage path.

3. The greenhouse as defined in claim 1, wherein said film roof member hangs downwardly and may be rolled up around said weighted member all the way to said grids.

4. In a greenhouse construction including a base, a plurality of spaced upright supporting posts, a plurality of generally parallel horizontal grids connecting a pair of posts, the improvement comprising:

a hanging foil roof that may be opened or closed and including spaced parallel suspension lines moveable along said grids, a plastic film roof member attached to adjacent pairs of suspension lines so that the roof member is suspended from and hangs downwardly from and between said pairs of suspension lines, an elongated weighted member in the form of a solid bar running perpendicular to said grids and resting within the fold of said film roof member which extends from adjacent suspension lines, said roof being open when said adjacent suspension lines are brought together, and said roof being closed when said adjacent suspension lines are drawn apart.

* * * * *